May 5, 1964
A. G. SCHILBERG
3,131,963
CONSTRUCTION FOR MOTOR VEHICLE STUB FRAME
Filed Dec. 15, 1961
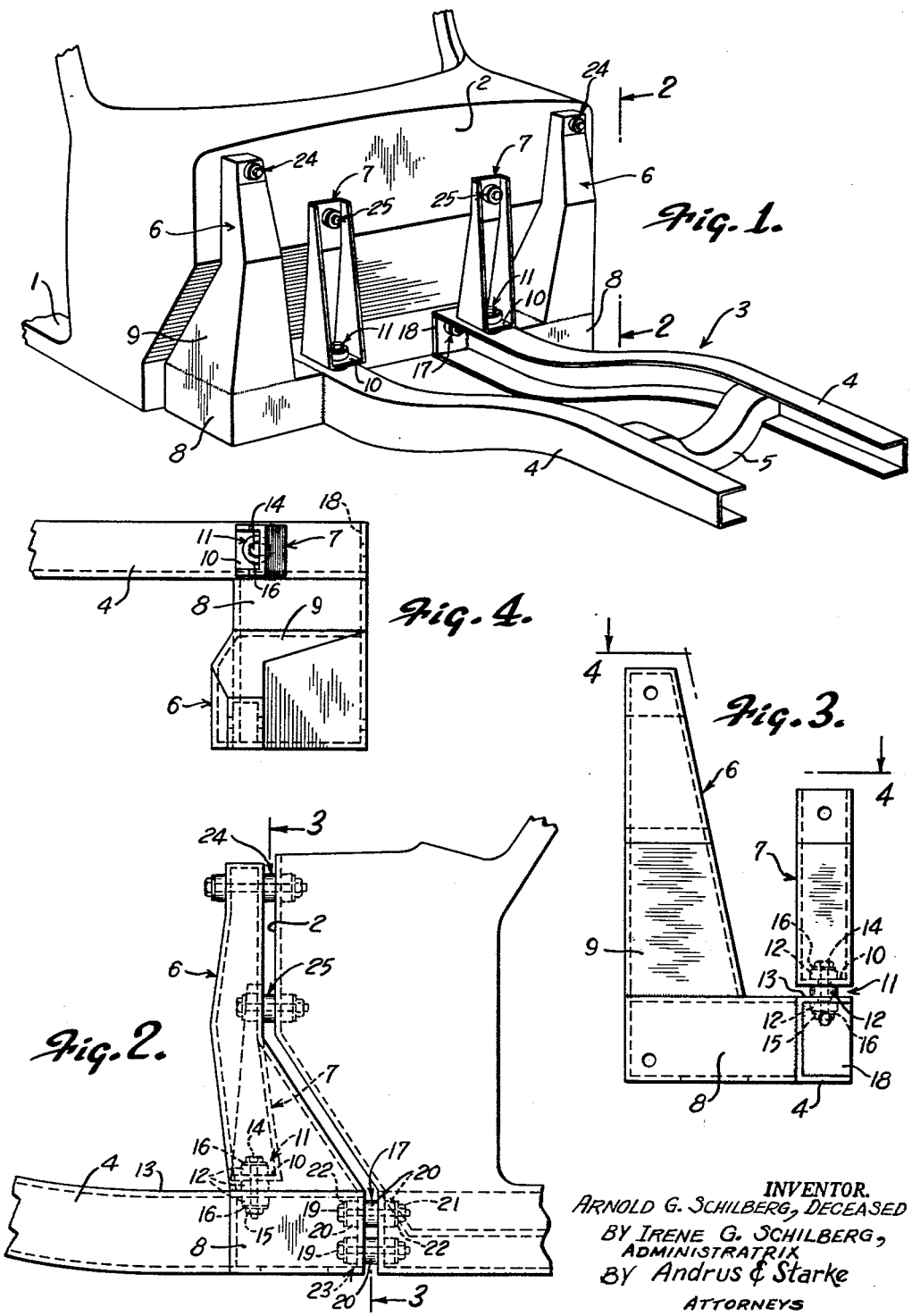
INVENTOR.
ARNOLD G. SCHILBERG, DECEASED
BY IRENE G. SCHILBERG,
ADMINISTRATRIX
BY Andrus & Starke
ATTORNEYS United States Patent Office 3,131,963
Patented May 5, 1964

3,131,963
CONSTRUCTION FOR MOTOR VEHICLE
STUB FRAME
Arnold G. Schilberg, deceased, late of Milwaukee, Wis.,
by Irene G. Schilberg, administratrix, Milwaukee, Wis.,
assignor to A. O. Smith Corporation, Milwaukee, Wis.,
a corporation of New York
Filed Dec. 15, 1961, Ser. No. 160,427
1 Claim. (Cl. 296—28)

This invention relates generally to motor vehicles of the type having a unitized construction and particularly relates to the stub frame of these vehicles.

Generally, in the so-called unitary vehicle construction, the chassis of the vehicle is composed of front and rear stub frame units and an integral, sheet metal frame and underbody assembly connected rigidly to and between the frame units. As compared to the separate frame and body design, the unitary vehicle provides a somewhat harsher and noisier ride due to the rigid connections between the stub frames and the underbody proper and due to the lack of any insulation between the sheet metal members of the underbody.

Ordinarily, these stub frames were formed of a pair of short side rails connected in spaced relation by a crosspiece and most generally also included an X- or A-brace connected rigidly to intermediate portions of the side rails and rigidly to either the fire wall at the front of the underbody or the rear seat back wall at the aft end of the underbody. The chassis structure was extremely rigid overall as a consequence and, under heavy twisting and bending stresses in the frame units, the underbody was stressed rather severely and subjected to periodic high vertical and lateral displacement.

In other respects too, these conventional stub frames were somewhat less than satisfactory. For example, where it was desired to assemble these stub frames at one location for shipping to a final assembly point, it was found that the A-brace or X-brace on the frame precluded effective nesting of the frame units. Transportation costs per frame were thus not conducive to this practice.

The present invention provides a stub frame construction which eliminates the referred to disadvantages of conventional designs and which is attached to the center underbody through insulated connections to provide more favorable overall riding characteristics in the final vehicle assembly.

According to the invention, the stub frame is formed with a pair of interconnected parallel extending side rails spaced less than the width of the underbody assembly and having offset torque boxes secured to their inner ends along the outboard side thereof. The torque boxes each rigidly support an upright brace which is secured at its upper end to the fire wall or rear seat back wall of the underbody as the case may be through rubber by bolts. The inner ends of each of the rails are bolted through rubber to a similar upright brace which is bolted at its upper end to the fire wall or rear seat back wall through rubber in the manner of the outboard braces. The ends of the rails and the torque boxes are separately bolted into the lower end portion of the fire wall or seat wall through rubber to complete the attachment of the frame to the underbody.

In the present construction then, the frame is attached to the underbody of the vehicle at each of a plurality of points across the fire wall or seat wall and along both the top and bottom portions thereof. Frame loads are thus effectively distributed over the underbody with the result that the composite chassis structure is effectively able to cope with and resist frame loads. Additionally, the attachments between the frame and underbody assembly being through rubber enable frame shocks and vibrations to be damped out or cut down substantially to provide an overall softer, more noiseless ride.

The frame itself is not as stiff as previous designs as there is no A-brace or the like and due to the provision of the flexible connection between the inner brace and the frame side rail. The frame members are thus permitted to yield relatively of one another under twisting and bending loads and in this manner are able to reduce the overall stresses developed in the frame and the corresponding stresses and movement or displacement of the vehicle underbody.

The frame design is very conducive to economical shipping as it permits practically full nesting and is thus of further advantage in this respect.

The drawing furnished herewith illustrates the best mode presently contemplated of carrying out the invention.

In the drawing:

FIG. 1 is a perspective view of the improved stub frame of the invention showing the manner in which it is attached to the front end of the frame and underbody assembly of a motor vehicle;

FIG. 2 is a fragmentary side elevational view of the inner end of the stub frame and the fire wall taken along the lines 2—2 of FIG. 1;

FIG. 3 is a rear elevational view of the inner end of the stub frame showing one side only thereof, taken along the lines 3—3 of FIG. 2; and FIG. 4 is a top plan view of the portion of the stub frame of FIG. 3 and which is taken along the lines 4—4 of FIG. 3.

Although the stub frame of the present invention may be applied equally well to either the rear or front end portions of the underbody and frame unit, in the specific embodiment shown, it is applied to the front end of the unit. In the drawing, the center portion 1 of the vehicle is shown as having a generally vertically disposed sheet metal fire wall 2 secured across its front end to which the improved stub frame 3 of the invention is secured as will be explained.

Stub frame 3 is comprised essentially of a pair of channel section side rails 4, a cross rail 5, and the pairs of upright braces or brackets 6 and 7. Side rails 4 constitute the main load carrying members of stub frame 3 and are secured in generally parallel, horizontally extending relation by cross rail 5 disposed near the front ends of the rails and nested therein as shown. Rail 5, it will be understood, serves to support the vehicle engine, not shown.

Rails 4 are spaced apart somewhat less than the width of vehicle assembly 1 and their inner or rear ends are secured to the sheet metal torque boxes 8. Boxes 8 are disposed outboard of rails 4 and normally thereto, terminating just short of the side edges of fire wall 2. Preferably, boxes 8 are welded to side rails 4 to secure a strong, rigid attachment therebetween.

Braces 6 and 7 are supported in upright position on the inner end of the frame 3 with the braces 6 disposed on boxes 8 and with braces 7 disposed inboard thereof on the inner ends of side rails 4. The outer pair of braces 6 have a generally box-shaped construction of varying width and depth and tapering outwardly in a direction proceeding downwardly and toward the rear of the frame to form a widened lower end portion or base 9. Braces 6 are secured rigidly on the top of the respective boxes 8 by welding, with the widened base 9 of braces 6 enabling a high strength attachment between the box 8 and braces 6.

The inboard braces 7 are somewhat shorter in length than braces 6 and have a generally channel sectional form, the lower end of braces 6 being closed by an integral end plate 10. It will be noted that braces 7 taper outwardly in proceeding toward the lower end thereof and in a direction both fore and aft of the vehicle. In this instance, a resilient attachment or connection is provided between the braces 7 and the corresponding rails 4 rather than the rigid connection described for braces 6. This connection is indicated by reference numeral 11 and is effected by providing a rubber shim 12 between plate 10 and the top surface 13 of rail 4 and additional shims 12 on the top of plate 10 and on the underside of rail surface 13, these shims 12 being secured by a fastening bolt 14 passed upwardly through rail surface 13 and plate 10 and through the shims. A suitable nut 15 is threaded to bolt 14 to draw the members firmly together and to compress the shims as desired. The washers 16 are provided between shims 12 and the bolt ends to spread bolt loads over the shims.

In general, the attachments between stub frame 3 and underbody 1 are made through resilient, damping media in order to insulate frame vibrations from underbody 1 and to dampen frame shock loads in the manner of a separate frame and body construction. A first of these frame-to-underbody attachments 17 is effected between the inner end of side rails 4 and the vertical lowermost portion of fire wall 2. Side rail 4 has an integral end plate 18 for this purpose which is bent inboard of the rail. A suitable bolt 19 is passed horizontally between plate 18 through fire wall 2 with a shim 20 of rubber or other elastomeric material placed on either end of bolt 19 and between rail plate 18 and fire wall 2 to provide complete insulation between metal parts. The rails 4 are drawn tight against underbody 1 by suitable nuts 21 which are threaded to bolts 19. The washers 22 are interposed between the end shims 20 and the corresponding ends of bolt 19 as shown.

The torque boxes 8, rigid with side rails 4, are also attached into the bottom of fire wall 2 as indicated at 23. These attachments 23 are identical in construction to attachments 17, consisting essentially of a number of the shims 20 and a bolt 19.

An additional pair of attachments 24 and 25 is made between the upper ends of each of the braces 6 and 7, respectively and the corresponding areas of the upper portion of the fire wall 2, in what corresponds to the dashboard region of the vehicle. Attachments 24 and 25 are identical to the previously referred to attachments 17 and 23 and accordingly need not be described in any detail.

The manner in which frame 3 is connected to underbody 1 is admirably suited from the standpoint of insuring that frame stresses are distributed widely over the full width of the underbody. More particularly, if will be seen that a plurality of individual frame to underbody attachments is made along the lower end of fire wall 2 while a corresponding series of separate attachments is made along the top of the fire wall in general vertical alignment with the corresponding attachments at the lower end of the fire wall. Frame loads are thus spread vertically and transversely with respect to the fire wall which is of known high rigidity to provide a frame and underbody composite structure which is effectively able to handle and cope with twisting and bending stresses in the frame.

In addition to the flexibility between frame 3 and underbody 1 attained through the aforesaid attachments 17, 23, 24 and 25, the present frame in and of itself affords a measure of flexibility by reason of resilient connection 17 between inboard braces 7 and side rails 4. The connection 17 enables the side rails 4 and braces 7 to yield relatively of another to relieve twisting and bending loads sustained by rails 4, thus reducing the overall stress level in the frame and ultimately in the underbody. When compared to the more rigid frames heretofore employed, the design of the invention produces a somewhat more comfortable ride as it is able to take up a portion of frame displacement and thus cut down on the ensuing displacement of the underbody.

The stub frame described herein does away with oblique bracing in the frame which prevented economical shipping of frame units and which tended to complicate the installation of the wheel suspensions and the engine to the frame on an assemblyline basis.

The proposed frame and underbody design eliminates to some extent the objectionable harsh, noisy riding qualities of previous unitary constructions and yet is strong and rigid in its overall design without being unduly heavy.

Where the stub frame is to be employed at the after end of frame and underbody assembly, it will be necessary to incline the braces and slightly rearwardly to the vertical due to the inclination of the rear seat back wall (not shown). The construction of the frame will be identical in all other respects to that at the front end as well as the attachment of the frame to the underbody assembly. A detailed description and showing of this application of the stub frame is not included as construction involved will be readily apparent to those skilled in the art to which this invention relates.

Various modes of carrying out the invention are contemplated as being within the scope of the following claim particularly pointing out and distinctly claiming the subject matter which is regarded as the invention.

I claim:

An end frame assembly adapted to be connected to an upright wall of a center unitary frame and underbody assembly of a motor vehicle comprising, a pair of parallel, horizontally extending side rails terminating at the lower portion of the upright wall of the underbody assembly, a cross rail intermediate the ends of said side rails and connected rigidly therebetween, a sheet metal torque box disposed at the inner end of each of said side rails along the outboard side thereof and connected rigidly thereto to provide a frame width at the inner end thereof substantially equal to the width of the end of the underbody assembly of the vehicle, a first upright brace secured to each of said torque boxes and adapted to extend to near the upper portion of the upright wall of the underbody assembly, a second upright brace resiliently connected to the inner end of each of said side rails and adapted to extend to the upper portion of the upright wall of the underbody assembly inboard of said first brace, and means to resiliently connect the side rails, the torque boxes, and the upper ends of the upright braces to the upright wall of the underbody assembly.

References Cited in the file of this patent
UNITED STATES PATENTS

| | | |
|---|---|---|
| 2,817,557 | Reynolds | Dec. 24, 1957 |
| 2,954,998 | Kushler | Oct. 4, 1960 |
| 2,964,331 | Sherman | Dec. 13, 1960 |